Dec. 7, 1926.

Re. 16,494

A. W. MALONE

SUPPORTING DEVICE

Original Filed Dec. 14, 1923

INVENTOR

Adolphus W. Malone

By Byrne, Stebbins & Parmelee

His Attys

Reissued Dec. 7, 1926.

Re. 16,494

UNITED STATES PATENT OFFICE.

ADOLPHUS WILLIAM MALONE, OF SPRINGDALE, PENNSYLVANIA, ASSIGNOR OF ONE-HALF TO ALBERT H. VESTAL, OF ANDERSON, INDIANA.

SUPPORTING DEVICE.

Original No. 1,486,594, dated March 11, 1924, Serial No. 680,705, filed December 14, 1923. Application for reissue filed May 16, 1925. Serial No. 30,871.

My invention relates broadly to supports, and has particular reference to such a device which is adapted to be clamped to the lower portion or end of an upright supporting member, such as a telegraph pole or the like, for the purpose of securely anchoring the supporting member to the ground, and holding it against falling movement.

An important object of the invention is to provide a supporting device of the above mentioned character, which is extremely simple in construction, cheap to manufacture, strong and durable.

Other objects and advantages of the invention will be apparent during the course of the following description.

In the accompanying drawings, forming a part of this specification, and in which like numerals are employed to designate like parts throughout the same:

Figure 1:
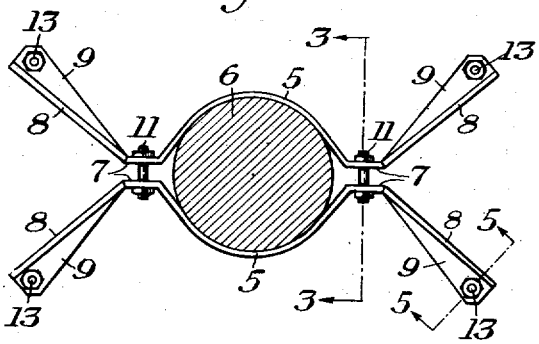
Figure 1 is a plan view of a supporting device embodying my invention.
Figure 3:
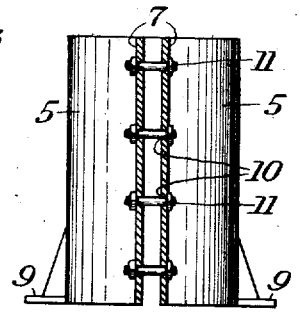
Figure 3 is a transverse section taken on the line 3—3 of Figure 1.
Figure 2:
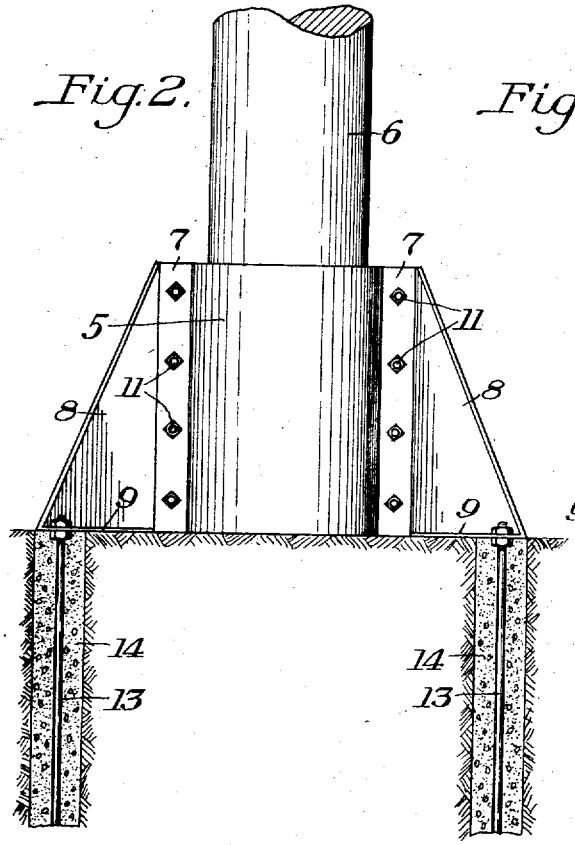
Figure 2 is a side elevation of the same.
Figure 4:
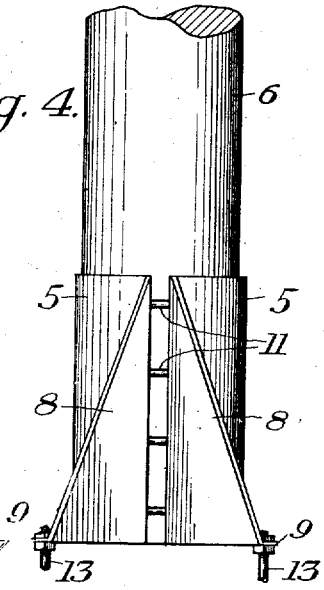
Figure 4 is an edge elevation of the device.
Figure 5:
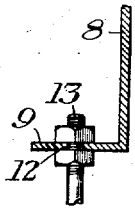
Figure 5 is a detail section taken on the line 5—5 of Figure 1.

In the drawings, wherein for the purpose of illustration is shown a preferred embodiment of my invention, the support is shown as formed of a pair of oppositely arranged companion clamping elements or sockets 5, which are substantially semi-circular in cross section, so that they provide an opening between the same for the reception of an upright supporting member, such as a telegraph pole 6 or the like, which is ordinarily circular in cross section. The clamping elements or sockets 5 are provided at their opposite ends with vertical flat preferably rectangular attaching or clamping portions 7, as shown. These clamping or attaching portions carry outwardly diverging braces or wings 8, disposed at suitable angles to the attaching or clamping portions 7, such as at an obtuse angle, as shown. The braces or wings 8 are provided at their lower ends or bottoms with horizontal bearing members or flanges 9, which preferably increase in width outwardly, as shown.

It is preferred that each of the clamping elements including the socket, the clamping or attaching portions 7, the wings or braces 8, and the bearings or flanges 9, be formed integral. This section may be stamped or bent from a single section of suitably stiff sheet metal, such as sheet steel.

The clamping or attaching portions 7 are provided with vertically spaced openings 10, for the reception of bolts 11, which are adapted to be manipulated for drawing the portions 7 together, and hence firmly clamping the elements or sockets 5 to the opposite sides of the pole 6.

The wings or braces 8 are preferably triangular and increase in width downwardly and the bearings or flanges 9 have openings 12 formed therein, receiving anchor rods or elements 13, which anchor elements or rods are securely embedded in the ground, as by being molded within concrete anchors 14, of any well known or preferred type. It will be apparent that the bearings or flanges 9 are separately supported on the concrete anchors 14 and that they are separately anchored to said concrete anchors by the anchor rods or elements 13.

As is well known, the ordinary telegraph pole ordinarily begins to rot, at the bottom of its exposed portion, in about ten to fifteen years. When this occurs, my supporting device may be applied to the lower portion of the pole, adjacent to the ground, and the supporting device is anchored to the ground, as explained. This supporting device will have sufficient strength to restore to the rotted portion of the pole its original strength. By this means, the life of the pole may be greatly prolonged. I also contemplate applying this supporting device to the lower end of a telegraph pole or the like, without sinking the pole in the ground. The supporting device will then serve as an anchoring means for the lower end of the pole with the ground. This is advantageous, inasmuch as it will enable the use of poles several feet shorter than the ordinary pole.

An important feature of the invention is the extreme simplicity of the device, the same being made in two principal parts or sections. This contributes to the cheapness at which the same may be manufactured, to the convenience in applying the same to a telegraph pole or the like, and effecting a connection between the supporting device and the anchoring means.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, I claim:

1. A support consisting of two elements joined together at points intermediate their ends and having an opening therethrough for the reception of the article to be supported, each of said elements being provided with diverging wings and each of said wings having laterally extending bearing portions thereon.

2. An article of manufacture comprising a semi-cylindrical body, laterally extending clamping portions on said body, outwardly extending braces on said clamping portions, and horizontally extending bearing members on the lower edges of said braces, the said bearing members being provided with means whereby anchors may be applied thereto.

3. A pole support consisting of two members clamped together adjacent their ends and having an opening therethrough for the reception of a pole, each of said members being integral and comprising a semi-cylindrical body to partially embrace the poles, rectangular laterally extending clamping members formed on said body, diverging wings of triangular shape on said clamping members, and horizontally extending flanges formed on the base of said wings, and anchors attached to said flanges.

4. A supporting device for telegraph poles or the like, formed in two parts, each part being stamped from sheet metal and embodying a socket shaped for receiving a portion of the telegraph pole, said socket carrying at its edges attaching portions, said attaching portions carrying upright braces diverging outwardly toward the outer closed side of the socket, anchoring flanges formed upon the braces, and means connecting the attaching portions and adapted to draw them together.

5. A support consisting of two elements joined together at points intermediate their ends and having openings for the reception of the article to be supported, each of said elements being formed of a single sheet of metal bent to provide wings, and each of said wings having a laterally extending bearing portion.

6. A support comprising two elements joined together at points intermediate their ends, each of said elements being formed of a single sheet of metal, said elements being bent outwardly for providing an opening for receiving the article to be supported, each of said elements being further bent providing wings, said wings having parts for engagement with anchor elements.

7. A supporting device for telegraph poles or the like, formed in two parts, each part being stamped from a single section of sheet metal and embodying a socket shaped for receiving a portion of the telegraph pole, said socket carrying at its edges attaching portions, said attaching portions carrying upstanding braces, said braces having means for engagement with anchor elements, and means connecting the attaching portions and adapted to draw them together.

8. The combination with a pole, of means for supporting the pole in the ground without disturbing the ground adjacent the base of the pole, said means including laterally projecting rigid members secured to the base portion of the pole above the ground, and a cement foundation in the ground spaced from the bottom of the pole on which the laterally extending members rest and to which they are secured.

9. The combination with a pole, of supporting means therefor secured thereto for sustaining the weight of the pole and resisting lateral movement thereof, said means including a plurality of earth embedded foundation members arranged about the pole and spaced therefrom, a plurality of rigid supporting elements secured to the pole and projecting laterally therefrom, said supporting elements terminating at and being secured to the foundation members, said supporting means being applicable to an erected pole while leaving the earth under and adjacent the base of the pole intact.

10. The combination with a pole, of supporting means therefor including a plurality of supporting plates fitted about the pole and clamped thereto, each of said plates having a radially extending web thereon, and an individual supporting column under each web spaced away from the base of the pole.

11. The combination with a pole, of supporting means therefor including a plurality of supporting plates fitted about the pole and clamped thereto, said plates having the edges thereof turned outwardly to form laterally projecting bracing webs, and an individual support under each web on which the lower edge of the web fits and to which it is secured.

12. The combination with an erected pole, of a supporting means therefor including a plurality of supporting plates clamped to the pole near its base portion, radially extending webs on the plates having their lower edges at substantially the ground line, and an individual support under each web spaced away from the pole.

13. The combination with an erected pole, of a supporting means therefor including a plurality of supporting plates clamped to the pole near its base portion, radially extending webs on the plates having their lower edges at substantially the ground line, and an individual support under each web spaced away from the pole, each of said individual supports having connecting means thereon secured to the respective webs.

In testimony whereof, I have hereunto set my hand.

ADOLPHUS WILLIAM MALONE.